United States Patent Office 3,344,109
Patented Sept. 26, 1967

3,344,109
AGE RESISTERS AND STABILIZED RUBBER
COMPOSITIONS CONTAINING SAME
Kurt Ley, Helmut Walz, and Wolfgang Redetzky, Leverkusen, and Helmut Freytag, Cologne-Stammheim, Germany, assignors to Farbenfabriken Bayer Aktiengesellschaft, Leverkusen, Germany, a corporation of Germany
No Drawing. Filed May 18, 1966, Ser. No. 550,899
Claims priority, application Germany, Mar. 28, 1962,
F 36,401
8 Claims. (Cl. 260—45.8)

This invention relates to novel compounds, their production and their use as age resisters in natural rubber and synthetic rubber-like polymers, and is a continuation-in-part of S.N. 267,930, filed Mar. 26, 1963, and S.N. 398,421, filed Sept. 22, 1964, both of which are now abandoned.

It is known that substituted phenols such as 2,6-ditertiary butyl-4-methylphenol or diphenols such as 2,2'-methylene-di-(4-methyl-6-tertiary butyl-phenol) may be used as age resisters for pale and colored rubber articles which should not become discolored or only to a slight extent in daylight. The compounds so prepared have the disadvantage that they have either an inadequate protective effect or are not satisfactory in preventing discoloration on exposure to natural light and are to a certain extent not readily available commercially. Furthermore, 2,5-alkylated hydroquinones impart only a very slight protection to rubber against oxidation.

It has now been found that compounds of the general formula (Formula I):

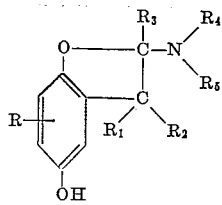

wherein each of $R_1$, $R_2$ and $R_3$ is hydrogen, an alkyl radical or a cycloalkyl radical, and wherein $R_1$ and $R_2$ can be bonded directly to each other, and wherein $R_1$ and $R_2$ together with the carbon atom to which they are attached can represent a 6-membered carbocyclic ring, which can optionally be substituted by alkyl radicals, and wherein R represents hydrogen or one or two alkyl radicals or an optionally substituted phenyl radical and wherein $R_4$ and $R_5$ represent alkyl or cycloalkyl radicals, and wherein $R_4$ and $R_5$ can also be bonded directly to one another, through a carbon or hetero atom bridge, can be used as age resisters for natural and synthetic rubber. The alkyl radicals advantageously represent lower alkyl radicals, which can contain up to 6 carbon atoms.

If R represents a phenyl radical then it can contain, for example, as substituents, alkyl radicals, preferably lower alkyl radicals such as methyl or ethyl, or alkoxy groups such as methoxy or ethoxy.

The compounds used according to the invention may be obtained by adding on enamines to p-benzoquinones with free 2,3-positions.

The enamines used for the reaction correspond for example to the following general formula (Formula II):

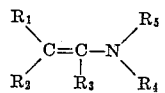

in which the radicals $R_1$ to $R_5$ have the meaning indicated above in Formula I. Examples of such compounds are isobutenylpyrrolidine, -piperidine, -morpholine, -diethylamine, -dimethylamine or the corresponding cyclohexenyl compounds. The alkyl radicals are preferably lower alkyl radicals containing up to 6 C-atoms. Specific enamines include N-(isobutenyl) morpholine,
N-(isobutenyl) piperidine,
N-(α-methylenecyclohex-3-enyl)morpholine,
N-(α-methylene-cyclohexyl)morpholine or
N-(α-methylenemethylcyclohex-3-enyl)morpholine.

Apart from p-benzoquinone itself, quinones which are substituted in the 5- and/or 6-position, e.g. by lower alkyl radicals such as methyl or ethyl radicals may also be used for the reaction. Examples of the p-quinones are the following compounds:

p-benzoquinone,
2-phenyl-p-benzoquinone,
2-(o-tolyl)-p-benzoquinone,
2-(p-tolyl)-p-benzoquinone,
2-(o-ethylphenyl)-p-benzoquinone,
2-(p-ethylphenyl)-p-benzoquinone,
2-(o-chlorophenyl)-p-benzoquinone,
2-(p-chlorophenyl)-p-benzoquinone,
2-(o-methoxyphenyl)-p-benzoquinone,
2-(p-methoxyphenyl)-p-benzoquinone,
2-(o-ethoxyphenyl)-p-benzoquinone or
2-(o-propoxyphenyl)-p-benzoquinone.

The production of the compounds used according to the invention is advantageously carried out in an inert solvent, such as benzene, toluene, methanol, ethanol or benzine. The quinone is generally provided initially and the enamine is introduced in small charges at temperatures between 0 and 80° C., advantageously at room temperature. It may be expedient for the reaction mixture thereafter to be heated for some time to its boiling point.

The di-hydroxycyclobutanes separate out on cooling.

The compounds used according to the invention are suitable as age resisters both for natural rubber and for synthetic rubber such as butadiene-styrene copolymers and butadiene-acrylonitrile copolymers. The compounds may be used both for protecting crude rubbers and mixtures thereof and the vulcanizates. In each case, between 0.1 and 5% by weight, preferably between 0.25 and 2% by weight calculated on the elastomers is added in the usual manner, e.g. by mixing on a roller or on an internal mixer.

Oxidation processes which lead to softening (degradation) or hardening (cyclization), depending on the type of elastomer used, are effectively prevented or greatly retarded by these additives, and no discolorations occur on exposure to light such as is characteristic for the age resisters of the secondary aromatic amine type (e.g. phenyl-β-naphthylamine) which have been used for a long time.

EXAMPLE 1

The following mixture was prepared on a roller:

| | Parts by weight |
|---|---|
| Pale crepe | 100.0 |
| Zinc oxide | 10.0 |
| Stearic acid | 1.0 |
| Titanium dioxide | 10.0 |
| Blanc fixe | 60.0 |
| Tetramethylthiuramic disulphide | 0.5 |
| Sulphur | 2.0 |
| Age resister as given in Table 1. | |

The substance is then vulcanized in a press for 17 minutes at 2 atmospheres above atmospheric pressure (133°

C.). The vulcanizate so obtained has the following mechanical properties:

Table 1

(a) With 1% by weight of 2,2'-methylene-di-(4-methyl-6-tertiary butyl-phenol) (for comparison)

| | Strength, kg./cm.$^2$ | Elongation, percent | Load at 450% elongation, kg./cm.$^2$ | Elasticity, 20° C./75° C., percent | Shore hardness A |
|---|---|---|---|---|---|
| Before aging | 205 | 690 | 67 | 68/76 | 48 |
| Aging in an oxygen bomb (according to Bierer-Davis) 21 atmospheres above atmospheric pressure of oxygen at 70° C.: | | | | | |
| After 6 days | 175 | 590 | 84 | 71/74 | 52 |
| After 11 days | 155 | 575 | 81 | 65/73 | 50 |
| After 16 days | 135 | 560 | 75 | 60/67 | 48 |

Color of the vulcanizates:
  Before illumination _____ White.
  After 2 months' weathering in the open air _____ Pale pink.
Formation of elephant skin: After 2 months' weathering in the open air _____ None.

(b) With 1% by weight of 2,6-di-tertiary butyl-4-methylphenol (for comparison)

| | Strength, kg./cm.$^2$ | Elongation, percent | Load at 450% elongation, kg./cm.$^2$ | Elasticity, 20° C./75° C., percent | Shore hardness A |
|---|---|---|---|---|---|
| Before aging | 190 | 670 | 69 | 70/74 | 48 |
| Aging in an oxygen bomb (according to Bierer-Davis) 21 atmospheres above atmospheric pressure of oxygen at 70° C.: | | | | | |
| After 6 days | 135 | 555 | 83 | 66/73 | 49 |
| After 11 days | 120 | 585 | 63 | 57/67 | 45 |
| After 16 days | 75 | 560 | 47 | 46/54 | 42 |

Color of the vulcanizates:
  Before illumination _____ White.
  After 2 months' weathering in the open air _____ Do.
Formation of elephant skin: After 2 months' weathering in the open air _____ None.

(c) With 1% by weight of compound

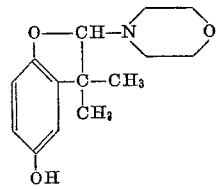

| | Strength, kg./cm.$^2$ | Elongation, percent | Load at 450% elongation, kg./cm.$^2$ | Elasticity, 20° C./75° C., percent | Shore hardness A |
|---|---|---|---|---|---|
| Before aging | 225 | 700 | 68 | 70/72 | 49 |
| Aging in an oxygen bomb (according to Bierer-Davis) 21 atmospheres above atmospheric pressure of oxygen at 70° C.: | | | | | |
| After 6 days | 185 | 590 | 94 | 67/72 | 52 |
| After 11 days | 145 | 540 | 91 | 63/70 | 50 |
| After 16 days | 145 | 545 | 90 | 50/64 | 59 |

Color of the vulcanizates:
  Before illumination _____ White.
  After 2 months' weathering in the open air _____ Do.
Formation of elephant skin: After 2 months' weathering in the open air _____ None.

(d) With 1% by weight of the compound

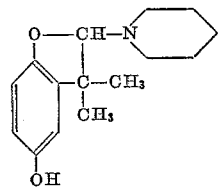

| | Strength, kg./cm.$^2$ | Elongation, percent | Load at 450% elongation, kg./cm.$^2$ | Elasticity, 20° C./75° C., percent | Shore hardness A |
|---|---|---|---|---|---|
| Before aging | 230 | 680 | 73 | 73/78 | 50 |
| Aging in an oxygen bomb (according to Bierer-Davis) 21 atmospheres above atmospheric pressure of oxygen at 70° C.: | | | | | |
| After 6 days | 175 | 555 | 100 | 67/73 | 53 |
| After 11 days | 160 | 545 | 88 | 63/68 | 52 |
| After 16 days | 140 | 515 | 97 | 59/67 | 50 |

Color of the vulcanizates:
  Before illumination _____ White.
  After 2 months' weathering in the open air _____ Pale cream color.
Formation of elephant skin: After 2 months' weathering in the open air _____ None.

(e) With 1% by weight of the compound

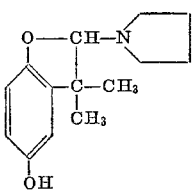

| | Strength, kg./cm.$^2$ | Elongation, percent | Load at 450% elongation, kg./cm.$^2$ | Elasticity, 20° C./75° C., percent | Shore hardness A |
|---|---|---|---|---|---|
| Before aging | 185 | 615 | 82 | 74/78 | 51 |
| Aging in an oxygen bomb (according to Bierer-Davis) 21 atmospheres above atmospheric pressure of oxygen at 70° C: | | | | | |
| After 6 days | 105 | 485 | 99 | 68/73 | 53 |
| After 11 days | 95 | 420 | | 65/70 | 52 |
| After 16 days | 80 | 390 | | 58/65 | 52 |

Color of vulcanizates:
  Before illumination _____ White.
  After 2 months' weathering in the open air _____ Cream colored.
Formation of elephant skin: After 2 months' weathering in the open air _____ None.

(f) With 1% by weight of the compound

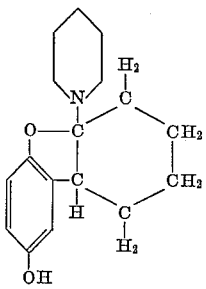

| | Strength, kg./cm.² | Elongation, percent | Load at 450% elongation, kg./cm.² | Elasticity, 20° C./ 75° C., percent | Shore hardness A |
|---|---|---|---|---|---|
| Before aging | 225 | 675 | 73 | 71/74 | 50 |
| Aging in an oxygen bomb (according to Bierer-Davis) 21 atmospheres above atmospheric pressure of oxygen at 70° C.: | | | | | |
| After 6 days | 155 | 550 | 96 | 65/70 | 52 |
| After 11 days | 120 | 525 | 83 | 55/62 | 48 |
| After 16 days | 85 | 445 | 80 | 46/53 | 48 |

Color of the vulcanizates:
  Before illumination _____ White.
  After 2 months' weathering in the open air _____ Slightly cream colored.
Formation of elephant skin: After 2 months' weathering in the open air _____ None.

(g) With 1% by weight of the compound

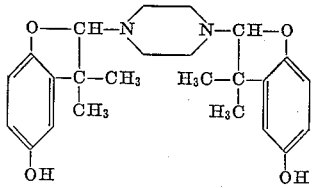

| | Strength, kg./cm.² | Elongation, percent | Load at 450% elongation, kg./cm.² | Elasticity, 20° C./ 75° C., percent | Shore hardness A |
|---|---|---|---|---|---|
| Before aging | 210 | 695 | 49 | 66 | 48 |
| Aging in an oxygen bomb (according to Bierer-Davis) 21 atmospheres above atmospheric pressure of oxygen at 70° C.: | | | | | |
| After 6 days | 175 | 615 | 80 | 64 | 52 |
| After 11 days | 135 | 585 | 74 | 60 | 49 |
| After 16 days | 125 | 575 | 68 | 52 | 47 |

Color of the vulcanizate:
  Before illumination _____ White.
  After 2 months' weathering in the open air _____ Do.
Formation of elephant skin: After 2 months' weathering in the open air _____ None.

(h) With 1% by weight of the compound

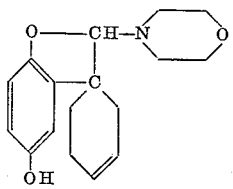

| | Strength, kg./cm.² | Elongation, percent | Load at 450% elongation, kg./cm.² | Elasticity, 20° C./ 75° C., percent | Shore hardness A |
|---|---|---|---|---|---|
| Before aging | 195 | 665 | 72 | 68/74 | 50 |
| Aging in an oxygen bomb (according to Bierer-Davis) 21 atmospheres above atmospheric pressure of oxygen at 70° C.: | | | | | |
| After 6 days | 180 | 595 | 89 | 65/68 | 52 |
| After 11 days | 150 | 570 | 85 | 63/68 | 50 |
| After 16 days | 135 | 550 | 82 | 54/65 | 47 |

Color of the vulcanizates:
  Before exposure to light _____ White.
  After weathering in the open for 2 months _____ Do.
Elephant skin formation: After weathering in the open for 2 months _____ None.

(i) With 1% by weight of the compound

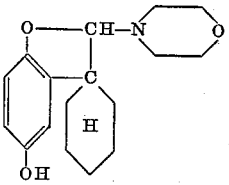

| | Strength, kg./cm.² | Elongation, percent | Load at 450% elongation, kg./cm.² | Elasticity, 20° C./ 75° C., percent | Shore hardness A |
|---|---|---|---|---|---|
| Before aging | 205 | 685 | 68 | 67/74 | 50 |
| Aging in an oxygen bomb (according to Bierer-Davis) 21 atmospheres above atmospheric pressure of oxygen at 70° C.: | | | | | |
| After 6 days | 175 | 590 | 86 | 64/68 | 51 |
| After 11 days | 135 | 550 | 84 | 60/63 | 50 |
| After 16 days | 120 | 530 | 82 | 53/69 | 48 |

Color of the vulcanizates:
  Before exposure to light _____ White.
  After weathering in the open for 2 months _____ Do.
Elephant skin formation: After weathering in the open for 2 months _____ None.

(j) With 1% by weight of the compound

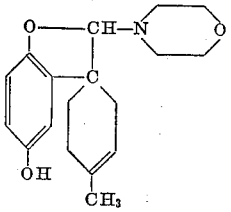

| | Strength, kg./cm.² | Elongation, percent | Load at 450% elongation, kg./cm.² | Elasticity, 20° C./ 75° C., percent | Shore hardness A |
|---|---|---|---|---|---|
| Before aging | 215 | 695 | 67 | 68/75 | 50 |
| Aging in an oxygen bomb (according to Bierer-Davis) 21 atmospheres above atmospheric pressure of oxygen at 70° C.: | | | | | |
| After 6 days | 180 | 595 | 88 | 63/67 | 52 |
| After 11 days | 135 | 550 | 80 | 57/65 | 50 |
| After 16 days | 125 | 540 | 79 | 56/62 | 48 |

Color of the vulcanizates:
  Before exposure to light _____ White.
  After weathering in the open for 2 months _____ Do.
Elephant skin formation: After weathering in the open for 2 months _____ None.

(k) With 1% by weight of the compound

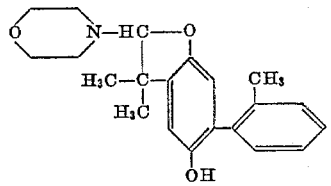

| | Strength, kg./cm.² | Elongation, percent | Load at 450% elongation, kg./cm.² | Elasticity, 20° C./75° C., percent | Shore hardness A |
|---|---|---|---|---|---|
| Before aging | 220 | 700 | 66 | 68/71 | 49 |
| Aging in the oxygen bomb (according to Bierer-Davis) 21 atmospheres above atmospheric pressure of oxygen at 70° C.: | | | | | |
| After 6 days | 150 | 570 | 83 | 62/66 | 50 |
| After 11 days | 135 | 570 | 75 | 59/61 | 48 |
| After 16 days | 115 | 550 | 73 | 56/59 | 45 |

Color of the vulcanizates:
  Before exposure to light _____ White.
  After weathering in the open for 2 months _____ Do.
Elephant skin formation: After weathering in the open for 2 months _____ None.

(l) With 1% by weight of the compound

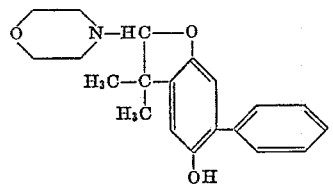

| | Strength, kg./cm.² | Elongation, percent | Load at 450% elongation, kg./cm.² | Elasticity, 20° C./75° C., percent | Shore hardness A |
|---|---|---|---|---|---|
| Before aging | 220 | 705 | 67 | 66/68 | 49 |
| Aging in an oxygen bomb (according to Bierer-Davis) 21 atmospheres above atmospheric pressure of oxygen at 70° C.: | | | | | |
| After 6 days | 170 | 595 | 85 | 65/70 | 50 |
| After 11 days | 135 | 570 | 78 | 61/65 | 45 |
| After 16 days | 110 | 535 | 78 | 53/62 | 46 |

Color of the vulcanizates:
  Before exposure to light _____ White.
  After weathering in the open for 2 months _____ Do.
Elephant skin formation: After weathering in the open for 2 months _____ None.

(m) With 1% by weight of the compound

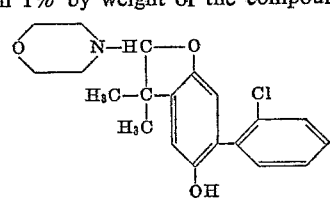

| | Strength, kg./cm.² | Elongation, percent | Load at 450% elongation, kg./cm.² | Elasticity, 20° C./75° C., percent | Shore hardness A |
|---|---|---|---|---|---|
| Before aging | 215 | 700 | 68 | 68/70 | 49 |
| Aging in the oxygen bomb (according to Bierer-Davis) 21 atmospheres above atmospheric pressure at oxygen at 70° C.: | | | | | |
| After 6 days | 155 | 580 | 88 | 62/65 | 51 |
| After 11 days | 125 | 560 | 74 | 58/60 | 47 |
| After 16 days | 80 | 510 | 65 | 50/54 | 43 |

Color of the vulcanizates:
  Before exposure to light _____ White.
  After weathering in the open for 2 months _____ Do.
Elephant skin formation: After weathering in the open for 2 months _____ None.

(n) With 1% by weight of the compound

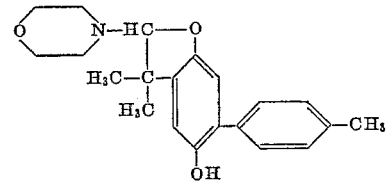

| | Strength, kg./cm.² | Elongation, percent | Load at 450% elongation, kg./cm.² | Elasticity, 20° C./75° C., percent | Shore hardness A |
|---|---|---|---|---|---|
| Before aging | 215 | 705 | 65 | 67/72 | 50 |
| Aging in an oxygen bomb (according to Bierer-Davis) 21 atmospheres above atmospheric pressure of oxygen at 70° C.: | | | | | |
| After 6 days | 165 | 580 | 90 | 63/68 | 51 |
| After 11 days | 140 | 580 | 80 | 61/65 | 48 |
| After 16 days | 115 | 545 | 78 | 5t/63 | 47 |

Color of the vulcanizates: Before exposure to light _____ White.
Elephant skin formation: After weathering in the open for 2 months _____ None.

(o) With 1% by weight of the compound

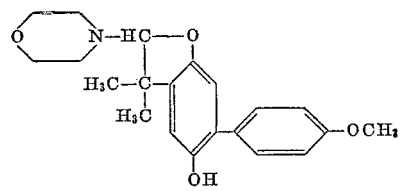

| | Strength, kg./cm.² | Elongation, percent | Load at 450% elongation, kg./cm.² | Elasticity, 20° C./75° C., percent | Shore hardness A |
|---|---|---|---|---|---|
| Before aging | 205 | 690 | 76 | 69/72 | 50 |
| Aging in an oxygen bomb (according to Bierer-Davis) 21 atmospheres above atmospheric pressure of oxygen at 70° C.: | | | | | |
| After 6 days | 155 | 580 | 83 | 62/67 | 50 |
| After 11 days | 140 | 570 | 80 | 59/62 | 48 |
| After 16 days | 105 | 525 | 75 | 55/61 | 46 |

Color of the vulcanizates:
  Before exposure to light _____ White.
  After weathering in the open for 2 months __ Do.
Elephant skin formation: After weathering in the
  open for 2 months _____ None.

EXAMPLE 1(b)

With 1% by weight of the compound

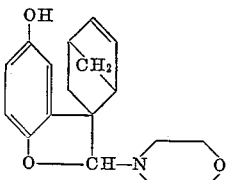

| | Strength, kg./cm.² | Elongation, percent | Load at 450% elongation, kg./cm.² | Elasticity, 20° C./75° C., percent | Shore hardness A |
|---|---|---|---|---|---|
| Prior to the aging_____ | 225 | 680 | 78 | 70/73 | 52 |
| Aging in the oxygen bomb (according to Bierer-Davis) 21 atmospheres above atmospheric pressure of oxygen at 70° C.: | | | | | |
| After 6 days_____ | 185 | 580 | 93 | 70/68 | 52 |
| After 11 days_____ | 145 | 540 | 90 | 60/67 | 51 |
| After 16 days_____ | 140 | 545 | 83 | 57/63 | 49 |

Color of the vulcanizates:
  Before exposure to light _____ White.
  After 2 months weathering in the open air _ Do.
Formation of elephant skin: After weathering
  in the open for 2 months _____ None.

EXAMPLE 2

The following mixture is prepared on a roller:

| | Parts by weight |
|---|---|
| Butadiene-styrene copolymer | 100.00 |
| Zinc oxide | 5.00 |
| Stearic acid | 1.50 |
| Chalk | 30.00 |
| Silicic acid | 50.00 |
| Plasticiser | 12.00 |
| Titanium dioxide | 8.00 |
| Sulphur | 2.20 |
| N-cyclohexyl-2-benzthiazyl sulphenamide | 1.30 |
| Tetramethylthiuramic disulphide | 0.15 |
| Age resister as shown in Table 2. | |

The mixture is vulcanized in a press for 30 minutes at 4 atmospheres above atmospheric pressure (151° C.). The vulcanizate so obtained has the following mechanical properties:

Table 2

(a) With 2.5% by weight 2,2'-methylene-di-(4-methyl-6-tertiary butyl-phenol) (for comparison)

| | Strength, kg./cm.² | Elongation, percent | Load at 200% elongation, kg./cm.² | Elasticity, 20° C./75° C., percent | Shore hardness A |
|---|---|---|---|---|---|
| Before aging_____ | 60 | 875 | 11 | 38/43 | 50 |
| Aging in a heating cupboard (according to Geer) at 100° C.: | | | | | |
| After 5 days_____ | 50 | 380 | 29 | 44/55 | 65 |
| After 10 days____ | 55 | 305 | 42 | 40/56 | 71 |
| After 15 days____ | 65 | 210 | 62 | 38/45 | 73 |

(b) With 2.5% by weight of 2,6-di-tertiary butyl-4-methylphenol (for comparison)

| | Strength, kg./cm.² | Elongation, percent | Load at 200% elongation, kg./cm.² | Elasticity, 20° C./75° C., percent | Shore hardness A |
|---|---|---|---|---|---|
| Before aging_____ | 60 | 970 | 10 | 39/41 | 49 |
| Aging in a heating cupboard (according to Geer) at 100° C.: | | | | | |
| After 5 days_____ | 40 | 280 | 31 | 47/56 | 64 |
| After 10 days____ | 45 | 230 | 42 | 39/55 | 73 |
| After 15 days____ | 50 | 160 | -------- | 37/54 | 76 |

(c) With 2.5% by weight of the compound

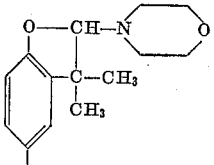

| | Strength, kg./cm.² | Elongation, percent | Load at 200% elongation, kg./cm.² | Elasticity, 20° C./75° C., percent | Shore hardness A |
|---|---|---|---|---|---|
| Before aging_____ | 60 | 685 | 14 | 39/46 | 56 |
| Aging in a heating cupboard (according to Geer) at 100° C.: | | | | | |
| After 5 days_____ | 50 | 390 | 28 | 45/55 | 63 |
| After 10 days____ | 55 | 355 | 38 | 41/57 | 72 |
| After 15 days____ | 60 | 260 | 48 | 38/55 | 75 |

(d) With 2.5% by weight of the compound

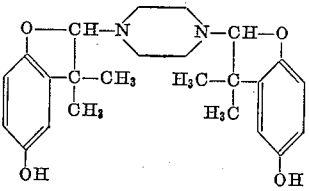

| | Strength, kg./cm.² | Elongation, percent | Load at 200% elongation, kg./cm.² | Elasticity, 20° C./75° C., percent | Shore hardness A |
|---|---|---|---|---|---|
| Before aging_____ | 80 | 770 | 14 | 40/45 | 56 |
| Aging in a heating cupboard (according to Geer) at 100° C.: | | | | | |
| After 5 days_____ | 55 | 425 | 29 | 43/54 | 66 |
| After 10 days____ | 55 | 335 | 40 | 39/55 | 72 |
| After 15 days____ | 55 | 245 | 52 | 38/55 | 75 |

EXAMPLE 3

The following mixture is prepared on a roller:

| | Parts by weight |
|---|---|
| Styrene-butadiene rubber | 100.0 |
| Zinc oxide | 5.0 |
| Carbon black | 45.0 |
| Stearic acid | 1.7 |
| Aromatic mineral oil plasticizer | 7.0 |
| Tetramethylthiuramdisulfide | 3.0 |
| 2-mercaptobenzthiazole | 1.0 |
| Age resister as indicated in Table 3. | |

The mixture is vulcanized for 20 minutes at 4 atm. (151° C.) in the press. The vulcanizate obtained has the following mechanical values:

*Table 3*

(a) With 2.5% by weight of 2,2'-methylene-bis-(4-methyl-6-tert. butyl-phenol) (for comparison)

| | Strength, kg./cm.² | Elongation at break, percent | Load at 200% elongation, kg./cm.² | Hardness (Shore A) | Elasticity, percent |
|---|---|---|---|---|---|
| Prior to the aging | 175 | 820 | 26 | 55 | 48 |
| Aging in hot air (Geer test) at 125° C.: | | | | | |
| After 4 days | 160 | 350 | 81 | 62 | 43 |
| After 10 days | 95 | 105 | | 72 | 35 |

(b) With 2.5% by weight of the compound

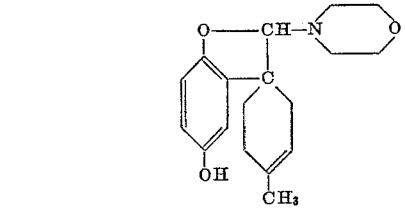

| | Strength, kg./cm.² | Elongation at break, percent | Load at 200% elongation, kg./cm.² | Hardness (Shore A) | Elasticity, percent |
|---|---|---|---|---|---|
| Prior to the aging | 170 | 725 | 32 | 57 | 49 |
| Aging in hot air (Geer test) at 125° C.: | | | | | |
| After 4 days | 170 | 445 | 62 | 62 | 44 |
| After 10 days | 135 | 230 | 116 | 67 | 41 |

EXAMPLE 4

The following mixture is prepared on a roller:

| | Parts by weight |
|---|---|
| Acrylonitrile-butadiene rubber | 100.0 |
| Zinc oxide | 10.0 |
| Carbon black | 45.0 |
| Stearic acid | 1.0 |
| Aromatic mineral oil plasticizer | 1.0 |
| Tetramethylthiuramdisulfide | 440 |
| Age resister as indicated in Table 4. | |

The mixture is vulcanized for 35 minutes at 4 atm. (151° C.) in the press. The vulcanizate obtained has the following mechanical values:

*Table 4*

(a) With 3% by weight of 2,2'-methylene-bis-(4-methyl-6-tert. butyl-phenol) (for comparison)

| | Strength, kg./cm.² | Elongation at break, percent | Load at 200% elongation, kg./cm.² | Hardness (Shore A) | Elasticity, percent |
|---|---|---|---|---|---|
| Prior to the aging | 190 | 685 | 39 | 63 | 26 |
| Aging in hot air (Geer test) at 125° C.: | | | | | |
| After 2 days | 110 | 250 | 83 | 70 | 23 |
| After 4 days | 70 | 90 | | 75 | 18 |

(b) With 3% by weight of the compound

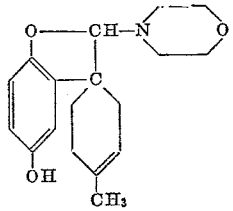

| | Strength, kg./cm.² | Elongation at break, percent | Load at 200% elongation, kg./cm.² | Hardness (Shore A) | Elasticity, percent |
|---|---|---|---|---|---|
| Prior to the aging | 195 | 660 | 45 | 64 | 27 |
| Aging in hot air (Geer test) at 125° C.: | | | | | |
| After 2 days | 160 | 340 | 77 | 69 | 23 |
| After 4 days | 75 | 105 | | 75 | 19 |

EXAMPLE 5

The compounds used according to the invention were obtained as follows:

(a)

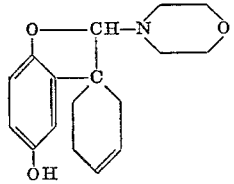

54 g. of p-benzoquinone are suspended in 400 ml. of methanol and 88 g. of N-(α-methylenecyclohex-3-enyl)-morpholine are added dropwise thereto while stirring. The reaction mixture is thereby heated up to 60° C. After the solution has cooled to 50° C., 50 ml. of a 20% aqueous sodium dithionite solution are added and the mixture is thereafter cooled to 10° C. The precipitated product is suction-filtered. There are obtained 90 g. of a compound which, after allowing to dissolve and crystallize from benzene-benzine, shows a melting point of 166–167° C.

$C_{17}H_{21}O_3N_1$ (287)—molecular wt.:
 Calculated: C, 71.3; H, 7.3; N, 4.87
 Found: C, 71.3; H, 7.5; N, 5.10

(b)

54. g. of p-benzoquinone are reacted as in Example 5a with 91 g. of N-(α-methylenecyclohexyl)-morpholine. There are obtained 85 g. of a compound, which melts at temperatures from 164–165° C.

$C_{17}H_{23}O_3N_1$ (289):
 Calculated: C, 70.5; H, 7.98; N, 4.85
 Found: C, 70.9; H, 8.00; N, 4.90

(c)

54 g. of p-benzoquinone are reacted as in Examples 5a and 5b with 97 g. of N-(α-methylenemethylcyclohex- 3-enyl)-morpholine. There are obtained 80 g. of a compound which melts at temperatures from 186–189° C.

$C_{18}H_{23}O_3N_1$ (301):
 Calculated: C, 71.8; H, 7.65; N, 4.65
 Found: C, 71.7; H, 7.80; N, 4.60

(d)
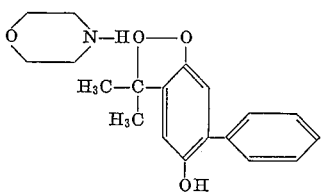

46 g. of 2-(α-phenyl)-p-benzoquinone are suspended in 150 ml. of methanol and thereafter 36 g. of isobutenylmorpholine are added dropwise while stirring. The reaction mixture is thereby heated to 60° C. After the solution has been cooled to 50° C., 50 ml. of a 20% aqueous dithionite solution are added, the solution is cooled to 10° C. and the precipitate is suction-filtered. After washing with water and thereafter drying, the compound melts from 158–160° C. 70 g. are obtained.

$C_{20}H_{23}O_3N_1$ (325):
 Calculated: C, 74.0; H, 7.08; N, 4.30
 Found: C, 73.5; H, 7.10; N, 4.35

(e)
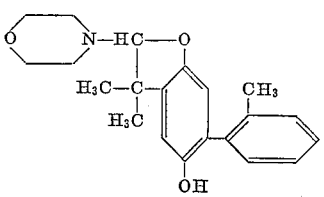

19.8 g. of 2-(o-tolyl)-p-benzoquinone are reacted with 14.1 g. of isobutenylmorpholine, as in Example 5d, and worked up. There are obtained 25 g. of a substance which melts from 178–180° C.

$C_{21}H_{25}O_3N_1$ (339):
 Calculated: C, 74.3; H, 7.38; N, 4.13
 Found: C, 73.9; H, 7.40; N, 4.30

(f)
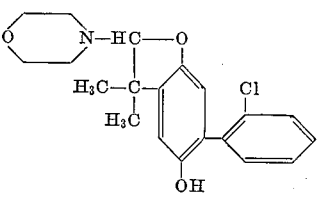

44 g. of 2-(o-chlorophenyl)-p-benzoquinone are reacted with 28.2 g. of isobutenylmorpholine, as in Example 5d, and worked up. There are obtained 62 g. of a compound, which melts from 198–200° C.

$C_{20}H_{22}O_3N_1Cl_1$ (359.5):
 Calculated: C, 66.8; H, 6.13; N, 3.9
 Found: C, 66.2; H, 6.20; N, 4.1

(g)
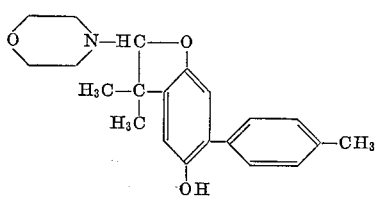

40 g. of 2-(p-tolyl)-p-benzoquinone are reacted with 28.2 g. of isobutenylmorpholine, as in Example 5d, and worked up. There are obtained 63 g. of a compound, which melts from 169–171° C.

$C_{21}H_{25}O_3N_1$ (339):
 Calculated: C, 74.3; H, 7.38; N, 4.13
 Found: C, 74.2; H, 7.40; N, 4.20

(h)
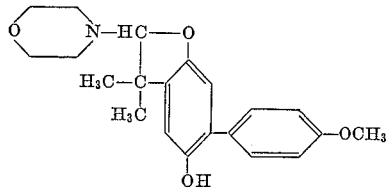

42.8 g. of 2-(p-anisyl)-p-benzoquinone are reacted with 28.2 g. of isobutenylmorpholine, as in Example 5d, and worked up. There are obtained 68 g. of a compound, which melts from 155–157° C.

$C_{21}H_{25}O_3N_1$ (356):
 Calculated: C, 71.0; H, 7.2; N, 3.95
 Found: C, 70.8; H, 7.2; N, 4.10

(i)
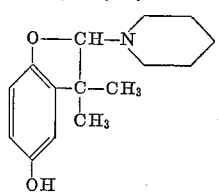

64.8 g. benzoquinone-(1,4) are dissolved in 800 ml. of benzene. 83.4 g. of isobutenylpiperidine are added dropwise at 10 to 20° C. When addition is completed, the mixture is stirred for another hour at room temperature. The precipitated product is removed by suction. 130 g. are obtained. Redissolving several times from methanol gives almost colorless crystals of melting point 162 to 163° C.

$C_{15}H_{21}O_2N$ (247):
 Calculated: C, 72.8%; H, 8.5%; N, 5.65%; O, 12.9%
 Found: C, 72.6%; H, 8.5%; N, 5.60%; O, 13.5%

(j)
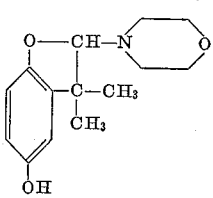

64.8 g. benzoquinone-(1,4) are dissolved in 800 ml. of benzene. 84.6 g. of isobutenylmorpholine are added dropwise at 10 to 20° C. with stirring. When addition is completed, the mixture is stirred for another ½ hour and the precipitate is removed by suction. 90 g. are obtained. Redissolving from methanol with the addition of a small amount of aqueous dithionite solution produces crystals of melting point 186 to 188° C.

$C_{14}H_{19}O_3N$ (249):
 Calculated: C, 67.30%; H, 7.65%; O, 19.25%; N, 5.60%
 Found: C, 67.0%; H, 7.7%; O, 19.7%; N, 5.6%

(k)
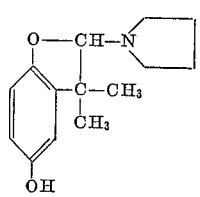

37.5 g. of p-benzoquinone are dissolved in 500 ml. of benzene. 32.4 g. of isobutenylpyrrolidine are added dropwise. When the reaction has died down, the product is heated to boiling for ½ hour and then cooled. The precipitated material is removed by suction. 45 g. of a compound melting at 140 to 144° C. are obtained.

$C_{14}H_{19}O_2N_1$ (233):
   Calculated: C, 72.2%; H, 8.15%; N, 6.00%
   Found: C, 71.6%; H, 8.04%; N, 5.73%

(l)

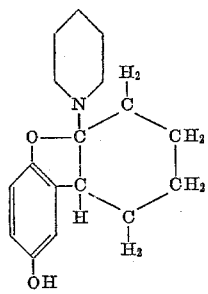

32.4 g. of p-benzoquinone are dissolved in 500 ml. of benzene. 48 g. of cyclohexenylpiperidine are added dropwise. The mixture is then heated to boiling for ½ hour. 60 g. of a compound which melts at 108 to 120° C. with evolution of gas crystallize out on cooling.

A corresponding compound is obtained when 50.1 g. of cyclohexenylmorpholine are used instead of cyclohexenylpiperidine. Melting point 99–102° C. with evolution of gas.

$C_{17}H_{23}O_2N_1 \cdot C_6H_6$ (353):
   Calculated: C, 78.8%; H, 8.25%; N, 4.0%
   Found: C, 78.5%; H, 8.20%; N, 4.0%

(m)

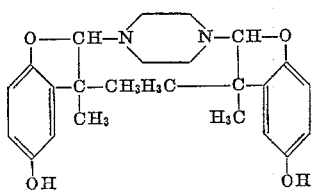

55 g. of p-benzoquinone are dissolved in 300 ml. of methanol. 49 g. of N,N'-di-isobutenylpiperazine are added dropwise. The temperature of the reaction mixture rises. The precipitated compound is removed by suction and washed with methanol. 90 g. of a product melting at 222 to 225° C. are obtained.

$C_{24}H_{30}O_4N_2$ (410):
   Calculated: C, 70.2%; H, 7.34%; N, 6.83%
   Found: C, 69.8%; H, 7.56%; N, 7.20%

(n)

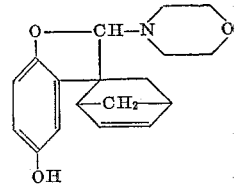

54 g. of p-benzoquinone are suspended in 600 ml. of methanol. 95 g. of N-(α-methylen-endomethylencyclohex-3-enyl)-morpholine are added dropwise while stirring and intensively cooling in such a manner that the temperature of the mixture does not rise above 10° C. Thereafter the mixture is stirred for another two hours at 10° C. and subsequently heated to boiling. Then the solution of 10 g. of sodium-dithionite in 200 ml. of water are added. The reaction mixture is heated another two hours to boiling, subsequently cooled to 5 to 10° C. and thereafter stirred for another two hours at 5 to 10° C. The precipitate obtained is removed by suction and washed with a mixture of methanol and water in the ratio of 2 to 1. 117 g. of the compound the formula of which is given above are obtained. After re-crystallizing from methanol the product has a melting point of 209° C.

$C_{18}H_{21}NO_3$ (299.4):
   Calculated: C, 72.3%; H, 7.1%; N, 4.7%
   Found: C, 72.34%; H, 7.37%; N, 4.68%

What we claim is:

1. As a new composition of matter, natural rubber or a synthetic diene rubber which is stabilized against discoloration from exposure to light by the incorporation therein of about 0.5–5% by weight, based on the rubber, of a compound of the formula

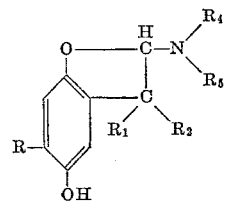

wherein R is hydrogen, lower alkyl, phenyl, alkyl-phenyl, or alkoxy-phenyl; $R_1$ and $R_2$ are hydrogen or lower alkyl, or are connected together to form a carbocyclic ring; and wherein $R_4$ and $R_5$ may be connected to each other through polymethylene groups or through a heterocyclic ring containing an O atom or another N atom.

2. The composition of claim 1 wherein the $R_1$ and $R_2$ groups of said compound are connected together to form an unsaturated carbocyclic ring.

3. The composition of claim 1 wherein the $R_1$ and $R_2$ groups of said compound are connected together to form a six-membered unsaturated carbocyclic ring.

4. The composition of claim 1 wherein the $R_1$ and $R_2$ groups of said compound are connected together to form an unsaturated carbocyclic ring having only one unsaturated bond.

5. The composition of claim 1 wherein the $R_1$ and $R_2$ groups of said compound are connected together to form a carbocyclic ring which is substituted by at least one methyl group.

6. The composition of claim 1 wherein the $R_4$ and $R_5$ substituents of said compound are connected together through an oxygen atom to form a morpholino ring.

7. The composition of claim 1 wherein said compound has the formula

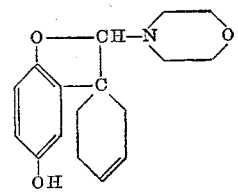

8. The composition of claim 1 wherein said compound has the formula

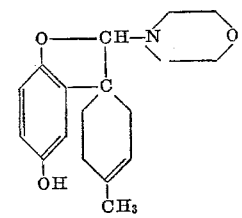

References Cited

UNITED STATES PATENTS

| | | | |
|---|---|---|---|
| 2,283,388 | 5/1942 | Paul et al. | 260—800 |
| 2,320,746 | 6/1943 | Paul | 260—880 X |

DONALD E. CZAJA, *Primary Examiner.*

LEON J. BERCOVITZ, *Examiner.*

M. WELSH, *Assistant Examiner.*